(12) United States Patent
Meyer et al.

(10) Patent No.: US 7,661,958 B2
(45) Date of Patent: Feb. 16, 2010

(54) METHODS AND APPARATUS FOR INTERIOR DESIGN COMPONENT SELECTION

(75) Inventors: Marcia R. Meyer, Paradise Valley, AZ (US); Colleen M. Pawling, Scottsdale, AZ (US)

(73) Assignee: CustomStart Design Ltd., Paradise Valley, AZ (US)

( * ) Notice: Subject to any disclaimer, the term of this patent is extended or adjusted under 35 U.S.C. 154(b) by 870 days.

(21) Appl. No.: 10/804,984

(22) Filed: Mar. 18, 2004

(65) Prior Publication Data
US 2005/0208455 A1    Sep. 22, 2005

(51) Int. Cl.
*G09B 25/00* (2006.01)
(52) U.S. Cl. ............................................. 434/72
(58) Field of Classification Search ................... 434/72, 434/74, 78, 81, 96, 98, 365, 367, 368, 369, 434/395, 404, 188, 198, 206, 210, 215; 116/223
See application file for complete search history.

(56) References Cited

U.S. PATENT DOCUMENTS

| | | | | | |
|---|---|---|---|---|---|
| 1,738,398 | A | * | 12/1929 | Sesti | 434/78 |
| 1,774,721 | A | * | 9/1930 | Morris | 116/223 |
| 2,065,624 | A | * | 12/1936 | Summers | 116/223 |
| 2,203,167 | A | * | 6/1940 | Lodwick | 434/98 |
| 2,285,379 | A | * | 6/1942 | Sherman | 434/367 |
| 2,314,790 | A | * | 3/1943 | Jenter | 434/368 |
| 2,317,673 | A | * | 4/1943 | Craig | 434/98 |
| 2,339,044 | A | * | 1/1944 | Barrett | 434/74 |
| 3,246,411 | A | * | 4/1966 | Aafedt | 116/222 |
| 3,277,591 | A | * | 10/1966 | Rutkofsky | 434/78 |
| 3,434,227 | A | * | 3/1969 | Brown | 434/98 |
| 3,479,752 | A | * | 11/1969 | Criger | 434/365 |
| 4,515,566 | A | * | 5/1985 | Sprague | 434/172 |
| 4,651,992 | A | * | 3/1987 | Danino et al. | 273/155 |
| 5,135,401 | A | * | 8/1992 | Feldman-Schorrig | 434/395 |
| 5,601,431 | A | * | 2/1997 | Howard | 434/79 |
| 5,615,636 | A | * | 4/1997 | Gustafson | 116/223 |
| 5,788,503 | A | * | 8/1998 | Shapiro et al. | 434/172 |
| 5,803,739 | A | * | 9/1998 | Hitchcock | 434/78 |
| 6,050,824 | A | * | 4/2000 | Stuart | 434/159 |
| D432,031 | S | * | 10/2000 | Miller et al. | D10/46.1 |
| 6,343,264 | B1 | | 1/2002 | Fenton et al. | |

(Continued)

OTHER PUBLICATIONS

Bryce, Nathan K., Insight Personality Instrument—How to Understand People Better Than They Understand Themselves, Mar. 2000, p. 1-26, Insight Learning Foundation, Mesa, AZ.

(Continued)

*Primary Examiner*—Kurt Fernstrom
(74) *Attorney, Agent, or Firm*—Ingrassia Fisher & Lorenz, P.C.

(57) ABSTRACT

Apparatus and methods are provided for interior design component selection. An apparatus for presenting a plurality of design components to a user has a first plurality of first design component samples and a second plurality of second design component samples. A binding mechanism is adapted to bind the first plurality of the first design component samples adjacent the second plurality of the second design component samples so that at least one design component sample of the first plurality and the second plurality can be viewed together. The binding mechanism is also configured to permit at least one design component sample of each of the first and the second pluralities to be moved about the binding mechanism.

29 Claims, 3 Drawing Sheets

U.S. PATENT DOCUMENTS

| | | |
|---|---|---|
| 6,572,377 B2 | 6/2003 | Masters |
| 6,729,883 B1 * | 5/2004 | Raiche .................. 434/206 |
| D495,361 S * | 8/2004 | Cowie et al. ............. D19/27 |

OTHER PUBLICATIONS

TestCafe—The Aura Color Test, [online] (retrieved Mar. 11, 2004). Retreived from Internet: <URL: http://www.testcafe.com/color>.

Color Personality—Personality and How it Relates to Color, (online) [retrieved Mar. 10, 2004]. Retreived from Internet: <URL: http://www.personal.psu.edu/users/c/g/cgd111/color1.htm>.

Color Connections—What is Your Color Personality?, [online] (retrieved Mar. 10, 2004), Retreived from Internet: <URL://www.colorconnections.com/your_color_personality/page1.html>.

Education World—Do You Know Your Students 'True Colors'?, [online] [retrieved Mar. 11, 2004], Retreived from Internet: <URL: education-world.com/a_admin/admin230.shtml>.

Panorama—The Effects of Color on Personality and Relationships, [online] [retrieved Mar. 10, 2004], Retreived from Internet: <URL: takingitglobal.orq/panorama/article.html>.

Care2—Your Favorite Color: What it Says About You, [online], [retrieved Mar. 11, 2004], Retreived from Internet: <URL:care2.com/channels/solutions/bms/815>.

Bharat Matrimony—Colour Psychology, [online] [retrieved Mar. 10, 2004], Retreived from Internet: <URL:bharatmatrimony.com/astrology/color.shtml>.

Decorating Studio—What is Your Color Personality?, [online] [retrieved Dec. 1, 2003], Retreived from Internet: <URL: decoratingstudio.com/articles_consumer_info/color_personality.htm>.

* cited by examiner

METHODS AND APPARATUS FOR INTERIOR DESIGN COMPONENT SELECTION

FIELD OF THE INVENTION

The present invention generally relates to interior decorating, and more particularly relates to methods and apparatus for the presentation and selection of interior design components.

BACKGROUND OF THE INVENTION

The popularity of home interior decorating and design continues to grow at an accelerating rate. Residential consumers demonstrate a strong desire to decorate and personalize their homes, apartments, offices, businesses, etc. by spending considerable sums on home decorating products and services. However, while residential consumers indicate a willingness to decorate their own residential and business spaces, such consumers often experience difficulty and frustration when doing so. Selecting colors, textures, patterns, accessories, lighting and the like to complement home or business architecture while expressing their personality preferences can be a daunting task for consumers who typically do not have formal interior decorating and design education.

While consumers can retain the services of professional interior decorators and designers, that is, those who have or claim to have formal education in these areas, many consumers choose not to do so for a variety of reasons. Consumers may find the services of such professionals to be cost-prohibitive, particularly when services are needed to decorate entire rooms, offices, homes or buildings. Consumers also may find it difficult to find an interior decorating and/or design professional that can appreciate and express the consumers' personal style preferences. Consumers also may hesitate to hire professional interior decorators and designers simply because they find it enjoyable and personally rewarding to decorate their own personal spaces.

The interior decorating of a residential or consumer space involves the selection of one or more of a variety of design elements, including, for example, paint, fabrics, carpeting, accessories and the like. However, to select such elements, consumers typically find it necessary to visit a variety of home products retailers, view hundreds of paint samples, fabric samples, carpeting samples, lighting and accessories, usually under poor conditions, and attempt to choose appropriate options with poor to fair staff assistance. Moreover, when decorating an entire room, house or office, consumers usually must select wall color, texture and pattern, carpet color, texture and pattern, and fabric color, texture and pattern in isolation, attempting to coordinate all the design components without the ability to view them together as a design scheme.

Accordingly, it is desirable to provide an apparatus that assists a user in selecting a decorating scheme. It is also desirable to provide an apparatus that presents to a user a plurality of design components viewable at the same time. In addition, it is desirable to provide an improved method for selecting a decorating scheme. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

According to an exemplary embodiment of the present invention, there is provided an apparatus for presenting a plurality of design components to a user. The apparatus has a first plurality of first design component samples and a second plurality of second design component samples. A binding mechanism is adapted to bind the first plurality of the first design component samples adjacent the second plurality of the second design component samples so that at least one design component sample of the first plurality and the second plurality can be viewed together. The binding mechanism is also configured to permit at least one design component sample of each of the first and the second pluralities to be moved about the binding mechanism.

According to another exemplary embodiment of the present invention, there is provided a method of selecting a decorating scheme from a design component collection. The design component collection comprises a first plurality of design component samples and a second plurality of design component samples that is disposed proximate to the first plurality so that a design component sample from the first plurality is viewable with a design component sample from the second plurality. The method comprises the step of displaying together a first design component sample of each of the first and second pluralities of design component samples. The method further comprises the step of displaying a second design component sample of at least one of the first and second pluralities of design component samples. The method also comprises the step of selecting at least one design component sample from each of the first and second pluralities to form a decorating scheme.

According to a further exemplary embodiment of the present invention, there is provided a method of fabricating a design components guide. The method comprises the steps of selecting a plurality of design components based on a decorating style and forming a first array and a second array of design component samples from the plurality of design components. The method further comprises the step of binding the first and second arrays so that at least one design component sample of each of the first and second arrays are viewable together.

According to yet another exemplary embodiment of the present invention, there is provided an apparatus for viewing a plurality of design components. The apparatus comprises a first plurality of design component samples. At least one design component sample of the first plurality is adapted to be rotated about an axis. The apparatus further comprises a second plurality of design component samples disposed adjacent the first plurality of design component samples. At least one design component sample of the second plurality is adapted to be rotated about the axis. A third plurality of design component samples is disposed adjacent the second plurality of design component samples. At least one design component sample of the third plurality is adapted to be rotated about the axis. At least one design component sample of each of the first plurality, the second plurality and the third plurality can be viewed together.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The various embodiments of the present invention relate to apparatus and methods that facilitate the interior decorating of a living or working environment, such as, for example, a room or office of a residential property, an entire interior of a residential property, a room or office of a commercial property, an entire interior of a commercial property, and the like. The various embodiments of the present invention may be utilized by any person that seeks to decorate the interior of a living or working environment, including homeowners, apartment dwellers and other consumers that do not have formal interior decorating education. The various embodiments of the present invention may also be useful to professional decorators and designers that have such formal education and seek to decorate an environment for themselves or for another person.

Figure 1:
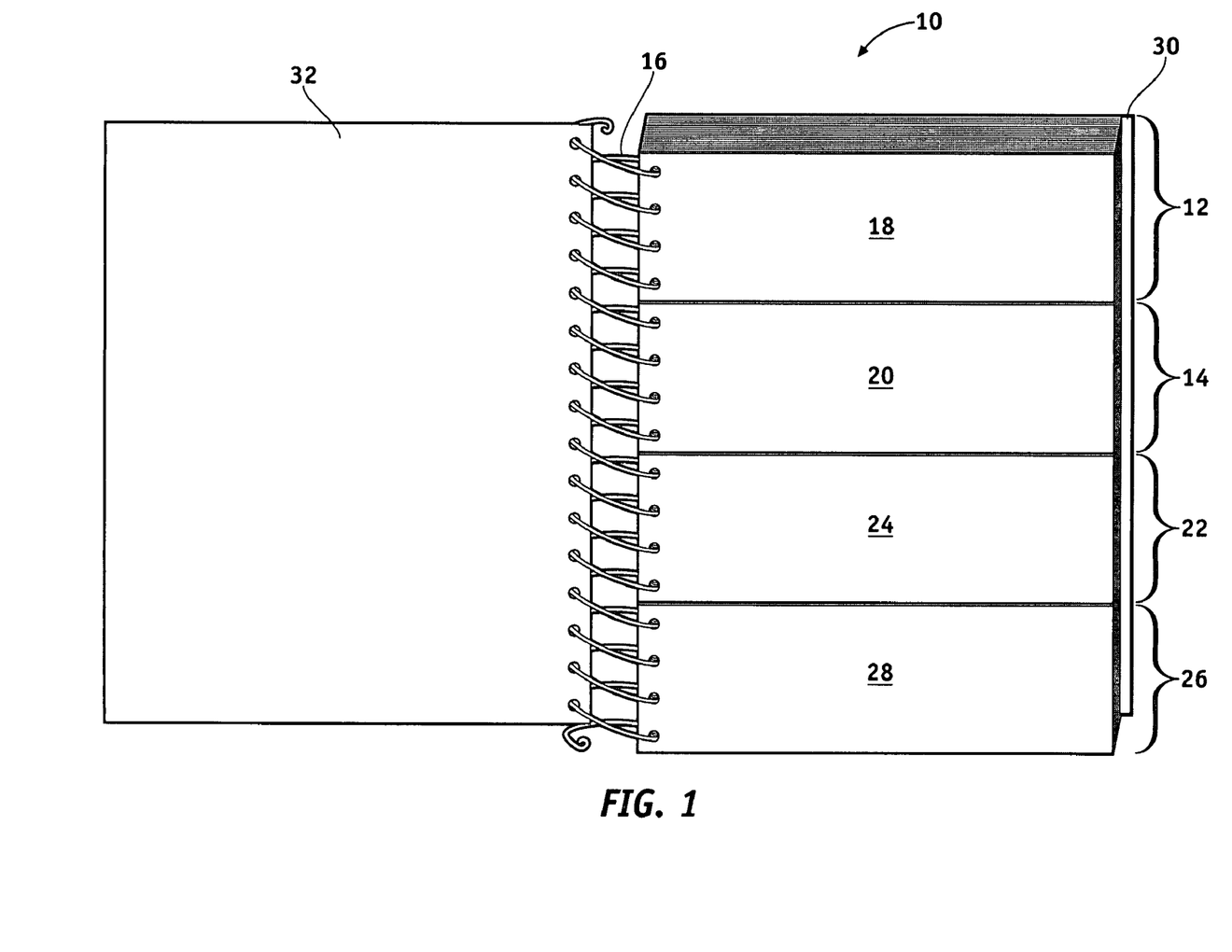
FIG. 1 is a schematic representation of a design component guide in accordance with one exemplary embodiment of the invention.

In accordance with one exemplary embodiment of the present invention, an apparatus 10 for presenting a plurality of design components to a user, hereinafter referred to as a design components guide, is illustrated in FIG. 1. Design components guide 10 comprises a first plurality or array 12 of first design component samples 18 and a second plurality or array 14 of second design component samples 20. The design components may comprise any suitable interior decorating or design elements, such as, for example, color, patterns, textures, materials, and the like. The design component samples 18, 20 may be samples, tabs, strips or stubs of a design component itself or of material that displays a design component. For example, the samples may be made from cardboard stock, paper, plastic or the like that displays the design component, such as a color or a pattern, on at least one side of the sample. Alternatively, the samples may be samples, tabs, strips or stubs of the design component itself, such as, for example, samples of carpet, samples of textiles, samples of materials such as tile, slate and the like, etc.

Figure 2:
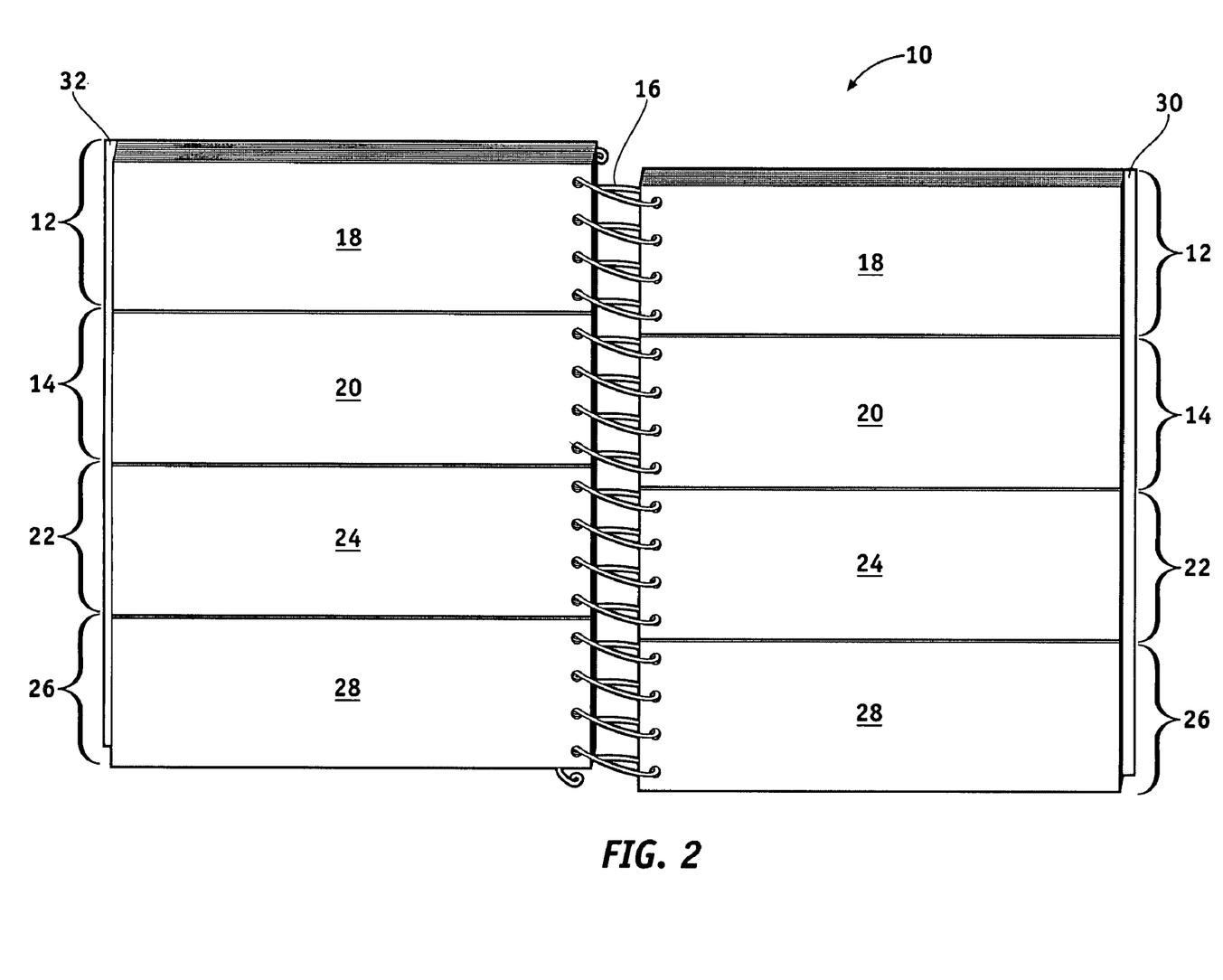
FIG. 2 is a schematic representation of the design component guide of FIG. 1 with design component samples rotated about a binding mechanism.

Design components guide 10 further comprises a binding mechanism 16. Binding mechanism 16 may comprise any suitable mechanism that binds, fastens, connects, or associates first plurality 12 of first design component samples 18 and second plurality 14 of second design components 20 together such that one of the first design components samples 18 may be viewed with one of the second design component sample 20. Binding mechanism 16 also is configured to permit a user to rotate about an axis, such as an axis of binding mechanism 16, or otherwise turn, flip or move at least one of the first plurality 12 of first design component samples 18 and at least one of the second plurality 14 of second design component samples 20 so that various samples of the two pluralities may be viewed at the same time. FIG. 2 illustrates apparatus 10 with various design component samples 18, 20 having been rotated about binding mechanism 16. Suitable examples of binding mechanism 16 include a spiral or coil binding, a comb binding, a two- or more-ring binding, tape binding, and the like. Preferably, binding mechanism 16 comprises spiral binding that permits the design component samples of the first and second pluralities 12, 14 to be rotated around an axis of the spiral binding so that each of the design component samples of the first plurality 12 can be viewed with each of the design component samples of the second plurality 14.

In one exemplary embodiment of the invention, the first design component samples 18 are of a different type of design component than the second design component samples 20. For example, in this embodiment, the first design component samples 18 may comprise color samples, such as wall paint color samples, and the second design component samples 20 may comprise carpet samples. In yet another exemplary embodiment of the invention, the first design component samples 18 and the second design component samples 20 are the same type of design components samples, such as, for example, color samples. In another, preferred, exemplary embodiment of the invention, the first design component samples 18 and the second design component samples 20 both comprise the same design components. For example, first design component samples 18 and second design component samples 20 may comprise the same color samples. In a more preferred embodiment of the invention, the second plurality 14 of second design component samples 20 comprise the same design component samples as the first plurality 12 of first design component samples 18 but the second design component samples 20 of the second plurality 14 are organized in a sequence that is different from a sequence in which the first design component samples 18 of the first plurality 12 are organized. This embodiment permits a user to mix and match various design component samples. For example, if the design component samples of the first and second pluralities 12, 14 comprise color samples, color samples from each of the first and second pluralities 12, 14 may be selected in accordance with a particular color theme. In this manner, the user can view two color samples of a particular color theme to develop an interior decorating scheme. In another embodiment of the invention, two opposing sides of the design component samples 18, 20 may display the same design component. Accordingly, by rotating design component samples of the first and second pluralities about the binding mechanism 16, the user can view three or four different design components at the same time.

In another exemplary embodiment of the invention, the first design component samples 18 may be of a different size than the second design component samples 20. For example, first design component samples 18 may be larger than second design component samples 20. In this regard, first design component samples 18 may serve as focal point samples for a design scheme and the second design component samples may serve as supporting samples for the design scheme.

In another exemplary embodiment of the present invention, apparatus 10 may comprise a third plurality 22 of third design component samples 24. Third design component samples 24 may comprise any design component and design component sample as described above for first and second design component samples 18, 20. Third plurality 22 of third design component samples 24 may also be bound or fastened with first plurality 12 of first design component samples 18 and second plurality 14 of second design component samples 20 by binding mechanism 16 so that one of each of the first design component samples 18, second design component samples 20 and third design component samples 24 may be viewed together. In a preferred embodiment of the invention, at least one of the third design component samples 24 may be rotated, turned, flipped or otherwise moved so that another design component sample of third plurality 24 can be viewed.

In one exemplary embodiment of the invention, the first design component samples 18 and/or second design component samples 20 are of a different type of design components than third design component samples 24. In yet another exemplary embodiment of the invention, the first design component samples 18, the second design component samples 20 and/or the third design component samples 24 are the same type of design components samples, such as, for example, color samples. In another, preferred, exemplary embodiment of the invention, the first design component samples 18, the second design component samples 20, and the third design component samples 24 comprise the same design component samples. For example, first design component samples 18, second design component samples 20, and third design component samples 24 are the same color samples. In a more preferred embodiment of the invention, the second plurality 14 of second design component samples 20 and the third plurality 22 of third design component samples 24 comprise the same design component samples as the first plurality 12 of first design component samples 18 but the first plurality 12, the second plurality 14, and the third plurality 22 are each organized in different sequences. This embodiment permits a user to mix and match three different design component samples. In interior decorating schemes, three different but coordinating or complementing colors typically are used to decorate a room or space. Accordingly, in this embodiment of the present invention, three different colors may be viewed at the same time and selected to develop an interior decorating scheme.

In another embodiment of the invention, two opposing sides of the design component samples of the first plurality 12, second plurality 14 and/or third plurality 22 may display the same design component. In this manner, by moving design component samples of the first, second and third pluralities about binding mechanism 16, the user can view four, five or six different design components at the same time.

In another exemplary embodiment of the present invention, apparatus 10 also may comprise a fourth plurality 26 of fourth design component samples 28. Fourth design component samples 28 may comprise any design component and design component sample as described above for first and second design component samples 18, 20. Fourth plurality 26 of fourth design component samples 28 may also be bound or fastened with first plurality 12 of first design component samples 18, second plurality 14 of second design component samples 20, and third plurality 22 of third design components 24 by binding mechanism 16 so that one of each of the first design component samples 18, second design component samples 20, third design component samples 24, and fourth design component samples 28 may be viewed together. In a preferred embodiment of the invention, at least one of the fourth design component samples 28 may be rotated, turned, flipped or otherwise moved so that another design component sample of fourth plurality 26 can be viewed. It will be appreciated that design component guide 10 further may comprise a fifth, sixth or any other number of pluralities of design component samples, each bound by binding mechanism 16 such that at least one of each of the pluralities of design component samples may be viewed together. It also will be appreciated that two opposing sides of the design component samples of the fourth plurality 26 and of the design component samples of any other additional plurality may display design components so that, by rotating the design component samples about binding mechanism 16, a user can view any suitable number of design components together.

In one exemplary embodiment of the invention, the first design component samples 18, second design component samples 20, and/or third design component samples 24 are of a different type of design component than fourth design component samples 28. In yet another exemplary embodiment of the invention, the first design component samples 18, the second design component samples 20, the third design component samples 24 and/or the fourth design component samples 28 are the same type of design components samples, such as, for example, color samples. In another, preferred, exemplary embodiment of the invention, the first design component samples 18, the second design component samples 20, and the third design component samples 24 comprise the same design component samples and the fourth design component samples 28 comprise design component samples that complement at least one of the first, second and third design component samples 18, 20 and 24. For example, first design component samples 18, second design component samples 20, and third design component samples 24 may comprise the same color samples of a color theme and the fourth design component samples 28 may comprise neutral color samples that coordinate with or complement the color theme. In this manner, a user can view and select three colors of a color theme along with a neutral color that complements the color theme.

In another exemplary embodiment of the invention, the first, second, third, and fourth design component samples may be of various sizes. For example, first design component samples 18 may be of a larger size than second and third design component samples 20, 24. In this regard, first design component samples 18 may serve as focal point samples for a design scheme and second and third design component samples 20, 24 may serve as supporting samples for the design scheme. Similarly, fourth design component samples 28 may be of smaller size than first, second and/or third design component samples 18, 20, 24. In this regard, fourth design component samples 28 may serve as neutral or accent design component samples of a design scheme that is based on the first, second and third design component samples. It will be appreciated, however, that first, second, third, and fourth design component samples 18, 20, 24, 28 may have any other suitable size variation or may all be of the same size.

In another embodiment of the present invention, design component guide 10 may comprise a back cover 30. Back cover 30 may provide support and stability to design component guide 10 and, depending on the type of binding mechanism 16 used, may prevent the first, second, third and/or fourth pluralities of design component samples from rotating into each other.

In a further embodiment of the present invention, design component guide 10 may comprise a front cover 32. Front cover 32 may provide support and stability to design component guide 10 and, depending on the type of binding mechanism 16 used, may prevent the first, second, third and/or fourth pluralities of design component samples from rotating into each other. It will be appreciated that design component guide 10 also may comprise any additional pages or sheets, design component samples, instructions, and the like. For example, design component guide 10 may comprise instructional pages that give brief instruction on interior decorating and/or on methods for using the design component guide 10.

The design component samples of design component guide 10 may be selected and collected into design component guide 10 based on a particular interior decorating theme or style. For example, design component guide 10 may comprise color samples, textures, patterns or materials that are associated with a modern style of interior decorating, an outdoors interior decorating theme, a southwestern style of interior decorating, or the like. Accordingly, any number and variety of design component guides 10 may be fabricated, each of the various design component guides 10 comprising a collection of design component samples that have been selected and combined based on an interior decorating theme.

In another exemplary embodiment of the present invention, a number of design component guides 10 may be fabricated from design component samples that have been selected based on various consumer "design color personalities." It is well known in the interior decorating industry that particular types of human personalities typically are attracted to, prefer, or react to particular types, shades or hues of colors and that colors have different effects on people of different personality types. For example, certain human personalities may be attracted to or prefer bold colors, other personalities may be attracted to or prefer pastel colors, while other personalities may be attracted to or prefer muted colors. It is often preferable to decorate a consumer's living or working environment with an interior decorating scheme that is based on the consumer's "design color personality," that is, the consumer's preferences for and reactions to particular design colors or design color schemes. In this manner, the consumer is likely to find her living or working environment aesthetically appealing and harmonious with her living or working style.

A consumer's design color personality may be deduced from the responses the consumer provides to a plurality of questions that are directed to determining color preferences. Any number of design color personality tests or questionnaires are well known and used by the interior decorating industry to determine a person's design color personality or design color preferences and, thus, will not be discussed in further detail herein. Accordingly, a variety of design component guides 10 may be fabricated, each based on a human design color personality, and a particular design component guide 10 may be selected for a consumer based on the consumer's design color personality. Thus, after determining a consumer's design color personality, the consumer, or another individual such as an interior decorator, may select a design component guide 10 that comprises colors that correspond to the consumer's design color personality. In this manner, a color scheme and/or interior decorating theme may be selected from colors or other design components that reflect the consumer's personality or that are personalized for a consumer's lifestyle or preferences.

Figure 3:
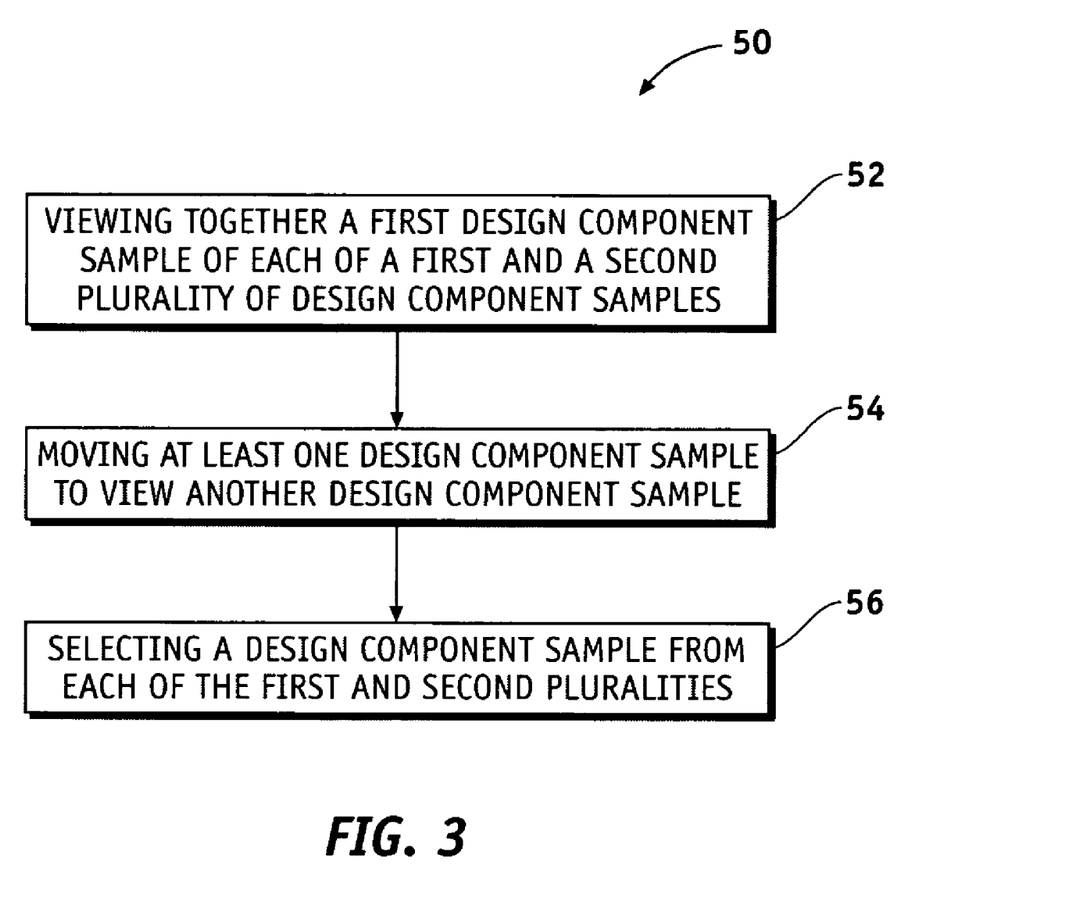
FIG. 3 is a flow chart of a method of selecting a decorating scheme for a consumer in accordance with an exemplary embodiment of the present invention.

Referring to FIG. 3, a method 50 for using an exemplary embodiment of the present invention to select a decorating scheme for a consumer will now be described. For convenience, the method will be described with reference to a design components guide 10 of FIGS. 1-2 that comprises four pluralities of the same design component samples, each plurality organized in a different sequence. However, it will be understood that the method may be performed utilizing a design components guide 10 having any suitable number of pluralities or arrays of any suitable types of design component samples, each plurality organized in any suitable sequence. Further, the method may be performed utilizing software that provides to the software user a design components guide having any suitable number of pluralities of any suitable types of design component samples and that permits the steps of method 50 to be performed via a computer. The method 50 may be performed by a consumer or may be performed by another user, such as a professional interior decorator, to select a decorating scheme for a living or working environment of the consumer.

The method 50 begins with the consumer and/or user viewing a design component sample from each of the four pluralities 12, 14, 22 and 26 of design component samples of the design components guide 10, step 52. The consumer and/or user then may move at least one design component sample from at least one of the pluralities 12, 14, 22, 26 of design component samples of the design components guide 10 so that a second design component sample from at least one of the pluralities 12, 14, 22, 26 of design component samples is viewable, step 54. In accordance with one exemplary embodiment of the present invention, the design component sample may be moved about binding mechanism 16. Preferably, the consumer and/or user views the first plurality 12 of first design component samples 18 by rotating each of the first design component samples 18 about binding mechanism 16 or otherwise moving a first, top sample of first design component samples 18 so that a second sample of first design component samples 18 is viewable. Likewise, the consumer and/or user also may view the second plurality 14 of the second design component samples 20, the third plurality 22 of third design component samples 24 and the fourth plurality 26 of the fourth design component samples 28 by rotating at least one of each plurality 14, 22, 26 about binding mechanism 16. It will be understood that, when method 50 is being performed utilizing software, step 54 may be performed by clicking or activating a prompt or icon that permits one design component sample from one of the pluralities 12, 14, 22 and 26 to be removed from the computer screen so that another design component from the same plurality can be viewed on the computer screen.

Upon viewing at least one design component sample from each of the pluralities 12, 14, 22 and 26 of the design component samples, the consumer and/or user then may select one from at least two of the pluralities 12, 14, 22 and 26 of the decorating samples to form a decorating scheme for the consumer's personal environment, step 56. In a preferable embodiment of the invention, the consumer and/or user selects one design component sample from each of the pluralities 12, 14, 22 and 26 to form a decorating scheme comprising four different but complementary design components. It will be understood that, when method 50 is being performed utilizing software, step 56 may be performed by clicking or activating a prompt or icon that permits a selected design component sample from the at least two of the pluralities 12, 14, 22 and 26 to be printed onto paper or other material so that the printed sample may be carried to and referenced at interior decorating offices or stores or home improvement stores.

In another exemplary embodiment of the invention, the design components guide 10 may be one of a plurality of design components guides. Each of the design components guides may have design component samples that are collected together into one design components guide based on a particular interior decorating theme, style and/or color. In other words, each of the design components guides has design component samples that are associated with a particular decorating theme, style and/or color. Method 50 may further comprise selecting one from the plurality of design component guides based upon personality traits and/or style preferences of the consumer. Such traits and/or preferences may be obtained from the consumer via a questionnaire or color/style preference test designed to elicit responses from the consumer to questions that are formulated to determine the consumer's personality traits and/or style preferences. Alternatively, an interior designer may determine a consumer's personal style preferences using other existing methods known in the interior decorating industry, such as, for example, showing the consumer a variety of interior decorating styles and/or colors and asking the consumer to select preferred styles and/or colors. Once the personality traits and/or style preferences of the consumer have been determined, the consumer or other user may select a design components guide 10 associated with personality traits and/or style preferences of the consumer.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An apparatus for presenting a plurality of design components to a user, the apparatus comprising:
   a first plurality of first design component samples comprising carpet samples, wall paint samples, textile samples, or fabric samples;
   a second plurality of second design component samples, wherein said first design component samples and said second design component samples comprise the same design component samples; and
   a binding mechanism adapted to bind said first plurality of said first design component samples adjacent said second plurality of said second design component samples so that at least one of each of said first plurality and said second plurality can be viewed together, said binding mechanism configured to permit at least one design component sample of each of said first and second pluralities to be moved about said binding mechanism.

2. The apparatus for presenting a plurality of design components of claim 1, said apparatus further comprising a third plurality of third design component samples, wherein said binding mechanism is adapted to bind said third plurality of said third design component samples adjacent said second plurality of said second design component samples so that at least one of each of said first plurality, said second plurality and said third plurality can be viewed together and wherein said binding mechanism is configured to permit at least one design component sample of said third plurality of said third design component samples to be moved about said binding mechanism.

3. The apparatus for presenting a plurality of design components of claim 2, said apparatus further comprising a fourth plurality of fourth design component samples, wherein said binding mechanism is adapted to bind said fourth plurality of said fourth design component samples adjacent said third plurality of said third design component samples so that at least one of each of said first plurality, said second plurality, said third plurality and said fourth plurality can be viewed together and wherein said binding mechanism is configured to permit at least one design component sample of said fourth plurality of said fourth design component samples to be moved about said binding mechanism.

4. The apparatus for presenting a plurality of design components of claim 1, wherein said first plurality of said first design component samples are organized in a first sequence and said second plurality of said second design component samples are organized in a second sequence and said first sequence and said second sequence are different.

5. The apparatus for presenting a plurality of design components of claim 2, wherein said third design component samples comprise samples of a design component selected from the group of design components comprising colors, textures, patterns, carpet, and materials.

6. The apparatus for presenting a plurality of design components of claim 2, wherein said first design component samples, said second design component samples and said third design component samples comprise the same design component samples.

7. The apparatus for presenting a plurality of design components of claim 6, wherein said first plurality of said first design component samples are organized in a first sequence, said second plurality of said second design component samples are organized in a second sequence and said third plurality of said third design component samples are organized in a third sequence and said first sequence, said second sequence and said third sequence are different.

8. The apparatus for presenting a plurality of design components of claim 3, wherein said third design component samples and said fourth design component samples each comprise samples of a design component selected from the group of design components comprising colors, carpets, textures, patterns and materials.

9. The apparatus for presenting a plurality of design components of claim 3, wherein said first design component samples, said second design component samples and said third design component samples comprise the same wall paint samples and said fourth design component samples comprise wall paint samples different from the wall paint samples of said first design component samples, said second design component samples and said third design component samples.

10. The apparatus for presenting a plurality of design components of claim 1, wherein said binding mechanism comprises one selected from the group comprising a spiral binding, a comb binding, a ring binding and a tape binding.

11. A method of selecting a decorating scheme from a design component collection, the design component collection comprising a first plurality of design component samples and a second plurality of design component samples disposed proximate to said first plurality of design component samples so that one design component sample from the first plurality is viewable with one design component sample of the second plurality, wherein said first plurality of design component samples and said second plurality of design component samples comprise the same design component samples, the method comprising the steps of:
    displaying together a first design component sample of each of said first and second pluralities of design component samples;
    displaying a second design component sample of at least one of said first and second pluralities of design component samples; and
    selecting at least one design component sample from each of said first and second pluralities of design component samples to form a decorating scheme.

12. The method of selecting a decorating scheme of claim 11, wherein the design component collection is one of a plurality of design component collections and the method further comprises the step of selecting one design component collection from said plurality of design component collections based upon preferences of a consumer.

13. The method of selecting a decorating scheme of claim 12, wherein the step of selecting one design component collection from said plurality of design component collections based upon preferences of a consumer comprises obtaining said preferences of said consumer by eliciting from said consumer responses to questions directed at determining style preferences.

14. The method of selecting a decorating scheme of claim 11, wherein said design component collection further comprises a binding mechanism adapted to bind said first plurality of design component samples adjacent said second plurality of design component samples so that at least one of each of said first plurality and said second plurality can be viewed together, the method further comprising the step of moving said first design component sample of at least one of said first and second pluralities of design component samples about said binding mechanism.

15. The method of selecting a decorating scheme of claim 14, wherein the step of moving said first design component sample about said binding mechanism comprises rotating said first design component sample about an axis of said binding mechanism.

16. The method of selecting a decorating scheme of claim 11, wherein the design component collection further comprises a third plurality of design component samples disposed adjacent the second plurality of design component samples so that one design component sample from said third plurality is viewable with one design component sample of each of the first and second pluralities, and wherein:
the step of displaying a first design component sample further comprises the step of displaying a first design component sample of said third plurality of design component samples with said first design component samples of each of said first and second pluralities of design component samples;
the step of displaying a second design component sample comprises the step of displaying a second design component sample of at least one of said first, second, and third pluralities of design component samples; and
the step of selecting comprises selecting at least one design component sample from each of said first, second and third pluralities of design component samples to form a decorating scheme.

17. The method of selecting a decorating scheme of claim 16, wherein the design component collection further comprises a fourth plurality of design component samples disposed adjacent said third plurality of design component samples so that one design component sample from said fourth plurality is viewable with one design component sample of each of the first, second and third pluralities, and wherein:
the step of displaying a first design component sample further comprises the step of displaying a first design component sample of said fourth plurality of design component samples together with said first design component samples of each of said first, second and third pluralities of design component samples;
the step of displaying a second design component sample comprises the step of displaying a second design component sample of at least one of said first, second, third, and fourth pluralities of design component samples; and
the step of selecting comprises selecting at least one design component sample from each of said first, second, third and fourth pluralities of design component samples to form a decorating scheme.

18. A method of fabricating a design components guide, the method comprising the steps of:
selecting a plurality of design components based on a decorating style;
forming a first array of design component samples from said plurality of design components;
forming a second array of design component samples from said plurality of design components, wherein said second array comprises the same design component samples as said first array; and
binding said first and second arrays so that at least one design component sample of each of said first and second arrays are viewable together.

19. The method of fabricating a design components guide of claim 18, the method further comprising:
forming a third array of design component samples from said plurality of design components; and
binding said third array adjacent said second array so that at least one design component sample from each of said first, second and third arrays are viewable together.

20. The method of fabricating a design components guide of claim 19, wherein said steps of forming said first, second and third arrays comprises forming said first, second and third arrays so that each array comprise the same design component samples.

21. The method of fabricating a design components guide of claim 20, wherein said steps of forming said first, second and third arrays comprise organizing said first array in a first sequence, organizing said second array in a second sequence, and organizing said third array in a third sequence, wherein said first sequence, said second sequence and said third sequence are different.

22. The method of fabricating a design components guide of claim 19, the method further comprising:
forming a fourth array of design component samples; and
binding said fourth array adjacent said third array so that at least one design component sample from each of said first, second, third and fourth arrays are viewable together.

23. The method of fabricating a design components guide of claim 22, wherein said first array, said second array and said third array comprise the same design component samples and said fourth array comprises design component samples different from said first, second and third arrays.

24. The method of fabricating a design components guide of claim 18, the step of binding comprising spiral binding said first and second arrays.

25. An apparatus for viewing a plurality of design components, the apparatus comprising:
a first plurality of design component samples comprising carpet samples, wall and/or household paint samples, textile samples, or fabric samples, at least one design component sample of said first plurality adapted to be rotated about an axis;
a second plurality of design component samples disposed adjacent said first plurality of design component samples, wherein said second plurality of design component samples comprises carpet samples, wall and/or household paint samples, textile samples, or fabric samples, at least one design component sample of said second plurality adapted to be rotated about said axis; and
a third plurality of design component samples disposed adjacent said second plurality of design component samples, wherein said third plurality of design component samples comprises carpet samples, wall and/or household paint samples, textile samples, pattern samples, or samples, at least one design component sample of said third plurality adapted to be rotated about said axis, wherein said first plurality, said second plurality and said third plurality are configured such that said at least one design component sample of each of said first plurality, said second plurality and said third plurality can be viewed together, and wherein said first plurality of design component samples and said second plurality of design component samples comprise the same design component samples.

26. The apparatus for viewing a plurality of design components of claim 25, wherein said first plurality of design component samples, said second plurality of design component samples and said third plurality of design component samples comprise the same design component samples.

27. The apparatus for viewing a plurality of design components of claim 26, wherein said first plurality of design component samples are configured in a first sequence, said second plurality of design component samples are configured in a second sequence and said third plurality of design component samples are configured in a third sequence and said first sequence, said second sequence and said third sequence are different.

28. The apparatus for viewing a plurality of design components of claim 25, further comprising a fourth plurality of design component samples disposed adjacent said third plurality of design component samples, at least a first design component sample of said fourth plurality adapted to be rotated about said axis, wherein at least a second design component sample of said fourth plurality can be viewed together with at least one design component sample of each of said first plurality, said second plurality, and said third plurality.

29. The apparatus for viewing a plurality of design components of claim 28, wherein said first plurality of design component samples, said second plurality of design component samples and said third plurality of design component samples comprise the same design component samples and said fourth plurality of design component samples comprises design component samples different from said first, second and third pluralities of design component samples.

* * * * *

UNITED STATES PATENT AND TRADEMARK OFFICE
CERTIFICATE OF CORRECTION

| | | |
|---|---|---|
| PATENT NO. | : 7,661,958 B2 | Page 1 of 1 |
| APPLICATION NO. | : 10/804984 | |
| DATED | : February 16, 2010 | |
| INVENTOR(S) | : Meyer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1322 days.

Signed and Sealed this

Thirtieth Day of November, 2010

David J. Kappos
*Director of the United States Patent and Trademark Office*